BEST AVAILABLE COPY

C. J. COBERLY

Feb. 17, 1931. CUTTING TORCH WITH MULTIPLICITY OF ORIFICES Re. 17,969

Original Filed March 17, 1924 2 Sheets-Sheet 1

INVENTOR
CLARENCE J. COBERLY
By Fred W. Lanier
ATTORNEY

Reissued Feb. 17, 1931 C. J. COBERLY Re 17969

CUTTING TORCH WITH MULTIPLICITY OF ORIFICES

Filed March 17, 1924 2 Sheets-Sheet 2

INVENTOR:
Clarence J. Coberly
By Fred W. Lamie
ATTORNEY.

Reissued Feb. 17, 1931

Re. 17,969

UNITED STATES PATENT OFFICE

CLARENCE J. COBERLY, OF LOS ANGELES, CALIFORNIA, ASSIGNOR TO KOBE, INC., OF LOS ANGELES, CALIFORNIA, A CORPORATION OF CALIFORNIA

CUTTING TORCH WITH MULTIPLICITY OF ORIFICES

Original application filed March 17, 1924, Serial No. 699,943. Divided and application filed September 15, 1927, Serial No. 219,659. Original No. 1,729,207, dated September 24, 1929. Application for reissue filed December 18, 1930. Serial No. 503,306.

The invention presented in this application relates to cutting torches and is a division of my application entitled "Cutting torch with multiplicity of orifices," filed March 17, 1924, Serial No. 699,943.

The ordinary oxyacetylene cutting torch has a cutting tip provided with a single central cutting-gas passage and a plurality of heating-gas passages surrounding this central cutting-gas passage. The operation of such a cutting torch is well known and consists in directing flames produced by the heating gas against the surface of the metal to be cut until it reaches a proper cutting temperature. At this time a cutting gas, such as oxygen, is supplied under pressure through the cutting-gas passage, this oxygen oxidizing the heated metal. The tip is moved along the surface of the metal so that a cut is produced.

It is one of the objects of this invention to provide a cutting-torch tip which is adapted to cut different sizes of slots with a single movement of the tip along the metal to be cut.

Another object of the invention is to provide a cutting torch in which there is a plurality of cutting-gas passages.

Another object of the invention is to provide a cutting torch in which there is a plurality of cutting-gas passages, which are completely surrounded by heating-gas passages.

A still further object of the invention is to provide a cutting tip in which the slot or cut produced thereby may have differently shaped ends.

Other objects and advantages of the invention will appear from the following description of advantageous embodiments thereof, taken in connection with the appended claims and the accompanying drawing in which:

Figure 1:
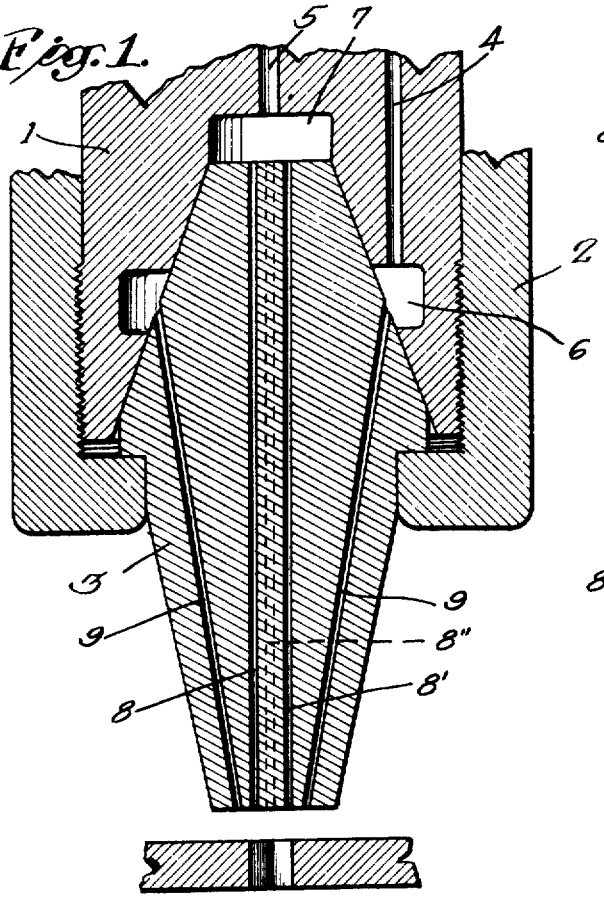
Fig. 1 is a vertical or longitudinal section which may be a medial section through the top of a torch embodying my invention.
Figure 2:
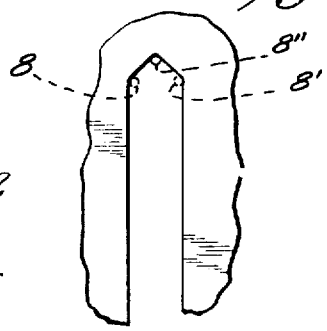
Fig. 2 is a diagrammatic representation of a slot such as might be cut by a torch of the character shown in Fig. 1, the relative position occupied by cutting jets at the moment of completing the slot being indicated by dotted lines.

Referring to the drawing in detail and particularly Figs. 1 and 2, the numeral 1 represents a body or barrel of the cutting torch, and the numeral 2 represents a threaded collar or thimble for retaining a removable tip 3 on the body 1. The body 1 is provided with ducts 4 and 5 which are adapted to deliver gas to the chambers 6 and 7. The duct 5 delivers cutting gas such as oxygen to the chamber 7, and the duct 4 delivers heating gas such as a mixture of oxygen and acetylene to the chamber 6. The removable tip 3 is provided with a plurality of cutting-gas delivery passages 8, 8′ and 8″ which are shown as extending substantially longitudinally of the tip 3. These cutting-gas passages may be arranged in different radial positions according to the type of slot which it is desired to be cut. The upper ends of these cutting-gas slots communicate with the chamber 7, and the lower ends communicate with the lower end of the tip 3. The tip 3 is also provided with heating-gas passages 9 which surround the cutting-gas passages 8, 8′, and 8″ as shown. The upper ends of the heating-gas passages 9 connect to the chamber 6, and the lower ends connect to the bottom of the tip 3, these lower ends surrounding the lower ends of the cutting-gas passages 8, 8′ and 8″. When the cutting-gas passages 8, 8′, and 8″ are arranged to form a triangle, as illustrated in Figs. 1 and 2, the torch embodying the invention may be used to cut, at a single movement of the torch along the surface of the metal, a comparatively wide slot which has an end composed of two angular faces, as illustrated in Fig. 2.

Figure 3:
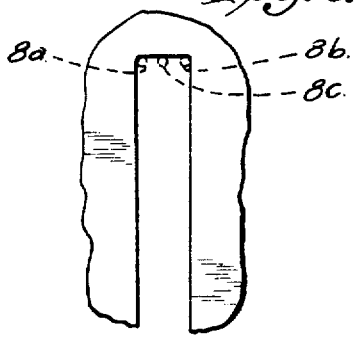
Fig. 3 is a similar diagram indicating the results obtained by slighrly different cutting jets, to form a slot having a substantially square or flat end.
Figure 6:
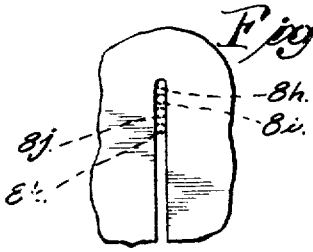
Fig. 6 is a diagram showing the results obtained by placing the jets in line along the axis of movement.
Figure 7:
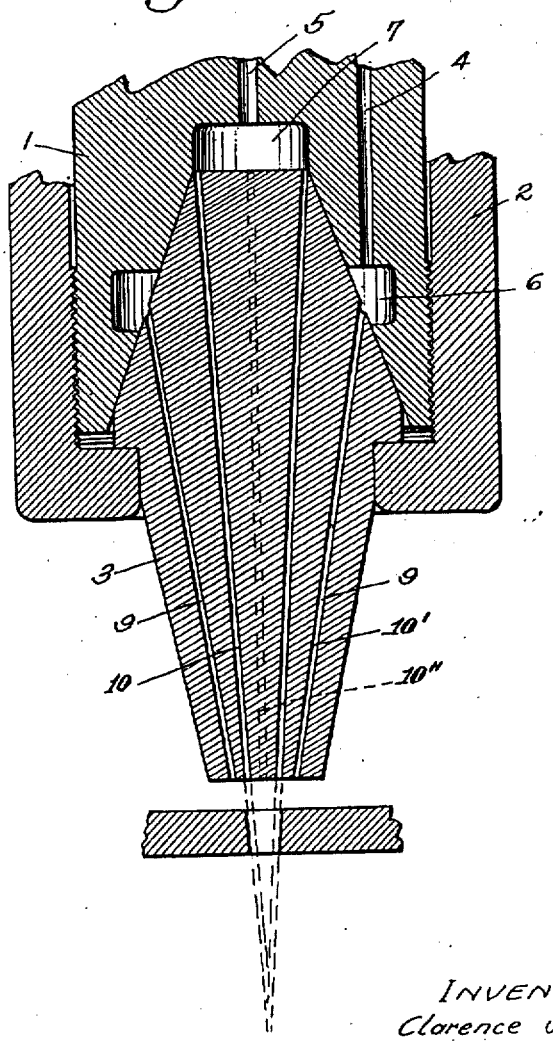
Fig. 7 shows a tip having non-parallel cutting jets.

By arranging the cutting-gas passages in the position indicated by the numerals $8^a$, $8^b$, and $8^c$, as shown in Fig. 3, a slot having a flat end may be cut. If it is desired to cut a slot having a rounded end, cutting-gas passages may be provided as indicated at $8^d$, $8^e$, $8^f$, and $8^g$ in Figs. 4 and 5. If desired, the cutting-gas jets may be provided in a single plane parallel to the direction of the cut being made as indicated at $8^h$, $8^i$, $8^j$, and $8^k$ in Fig. 6 When the cutting-gas passages are arranged in this position they may be made non-parallel so that the size of the slots produced may be of a suitable slope. Such a tip is shown in Fig. 7.

Figure 5:
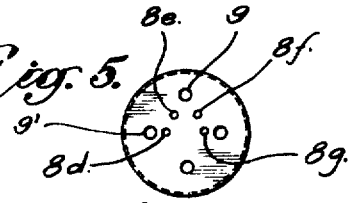
Fig. 5 is a bottom plan view of a torch tip suitable for use in cutting a slot such as is shown in Fig. 4.
Figure 4:
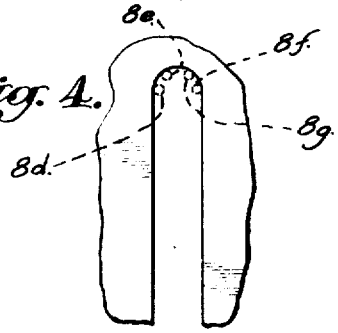
Fig. 4 is a view similar to Figs. 2 and 3, but showing how a suitable arrangement of jets may be employed in the formation of a slot having a rounded end.

By rotating the torch so that the cutting-gas passages occupy different positions relative to the plane of motion of the tip, it is possible to vary the width of the slot produced thereby; for example, if the tip, as shown in Fig. 5, which produces the slot shown in Fig. 4 were rotated ninety degrees, the slot produced would be substantially half as wide as is produced when the cutting-gas passages occupy the position shown relative to the direction of movement of the tip.

I claim as my invention:

1. In a cutting torch, the combination of: a body provided with cutting-gas passages for a cutting gas, and heating-gas passages for a heating gas, said cutting-gas passages being positioned at distances from the axis of said body less than the distances that the heating-gas orifices are positioned from the axis of said body.

2. In a cutting torch, the combination of: a body provided with a plurality of cutting-gas passages for cutting gas, and a plurality of heating-gas passages for heating gas, said heating-gas passages surrounding said cutting-gas passages.

3. In a cutting torch, the combination of: a body provided with a plurality of cutting-gas passages for cutting gas, and a plurality of heating-gas passages for heating gas, said heating-gas passages surrounding said cutting-gas passages, said cutting-gas passages being placed so that different widths of cuts in metal may be provided by turning the body so that said cutting-gas passages occupy a different position relative to the plane of movement of said body.

4. In a cutting torch: means providing a plurality of cutting-gas passages for a cutting gas and a plurality of heating-gas passages for heating gas, said cutting-gas passages being positioned at a distance from the axis of said torch less than the distance that the heating-gas orifices are positioned from the axis of said torch.

5. In a cutting torch: means providing a plurality of cutting-gas passages for a cutting gas and a plurality of heating-gas passages for a heating gas, said heating-gas passages surrounding said cutting-gas passages.

6. In a cutting torch: means providing a plurality of cutting-gas passages for a cutting gas and a plurality of heating-gas passages for a heating gas, said heating-gas passages surrounding said cutting-gas passages, said cutting-gas passages being disposed so that different widths of cuts in metal may be provided by turning the torch so that said cutting-gas passages occupy a different position relative to the plane of movement of said torch.

7. In a cutting torch: means providing a plurality of cutting-gas passages for a cutting gas and means for discharging heating gas from said torch, and means for producing different widths of cuts of metal.

8. In a cutting torch, a body provided with cutting-gas passages for a cutting gas and heating-gas passages for a heating gas, and means for cutting a slot with differently shaped ends.

9. In a cutting torch, a body provided with cutting-gas passages for a cutting gas and heating-gas passages for a heating gas, and means for cutting different sizes of slots with differently shaped ends.

10. A cutting torch provided with: cutting-gas passages for a cutting gas and heating-gas passages for a heating gas, and means for cutting different sizes of slots with differently shaped ends.

11. A cutting torch provided with: a plurality of cutting-gas passages for a cutting gas and a plurality of heating-gas passages surrounding said cutting-gas passages, and said cutting-gas passages adapted to be arranged in different radial positions according to the type of the slot which is desired to be cut.

12. A cutting torch provided with: a plurality of cutting-gas passages for a cutting gas and means provided by said torch for discharging heating gas therefrom, and said cutting-gas passages adapted to be arranged in different positions for producing different widths of cuts of metal having different shaped ends.

13. A cutting torch provided with: a plurality of cutting-gas passages for a cutting gas and heating-gas passage means for a heating gas, and means for cutting a slot in metals with a cutting gas to provide said slot with a predetermined shaped end.

14. A cutting torch provided with: a plurality of cutting-gas passages for a cutting gas and heating-gas passage means for a heating gas surrounding said cutting-gas passages, and means for cutting a slot having a predetermined shaped end.

15. A cutting torch provided with: a plurality of cutting-gas passages for a cutting gas and a plurality of heating-gas passages for a heating gas, said cutting-gas passages

US PATENT OFFICE

274 each arranged in a manner to direct a gas attack to a different portion of the heated metal.

16. A cutting torch provided with: a plurality of non-parallel cutting-gas passages for a cutting gas and a plurality of heating-gas passages for a heating gas surrounding said cutting-gas passages, said cutting-gas passages arranged each to emit a gas to attack a different portion of the heated metal.

17. A cutting torch provided with: a plurality of cutting-gas passages through which a cutting gas may be projected against the material to be cut; and means for supplying a cutting gas to said passages, said cutting-gas passages being so directed as to form a cutting jet of predetermined form adapted to cut a slot of predetermined cross-section.

18. A cutting torch provided with: a plurality of cutting-gas passages through which a cutting gas may be projected against the material to be cut; and means for supplying a cutting gas to said passages, said cutting-gas passages being so situated with relation to each other as to form a cutting jet of predetermined form adapted to cut a slot of predetermined cross-section.

19. A cutting torch provided with: a plurality of cutting-gas passages through which a cutting gas may be projected against the material to be cut; and means for supplying a cutting gas to said passages, said cutting-gas passages being so directed as to form a cutting jet of predetermined form adapted to cut a slot having non-parallel walls.

20. A cutting torch provided with: a plurality of cutting-gas passages through which a cutting gas may be projected against the material to be cut; and means for supplying a cutting gas to said passages, said cutting-gas passages being so situated with relation to each other as to form a cutting jet of predetermined form adapted to cut a slot having non-parallel walls.

21. A device for forming in metal a slot having non-parallel walls, said device including: a body structure having a plurality of relatively inclined oxygen jet holes; and means for passing oxygen through said oxygen jet holes.

22. A device for forming in metal a slot having non-parallel walls, said device including: a body structure having a plurality of relatively inclined oxygen jet holes positioned in close relationship; and means for passing oxygen to said oxygen jet holes.

23. A device for forming in metal a slot having non-parallel walls, said device including: a body having an oxygen chamber and a plurality of relatively inclined oxygen jet holes in communication with said chamber and with the exterior of said body; and means for supplying oxygen to said oxygen chamber.

24. A device for forming in metal a slot having non-parallel walls, said device including: a body having an oxygen chamber and a plurality of relatively inclined oxygen jet holes in communication with said chamber and with the exterior of said body, the exterior ends of said oxygen jet holes being connected to the same exterior portion of said body and being relatively close together; and means for supplying oxygen to said oxygen chamber.

In testimony whereof, I have hereunto set my hand at Los Angeles, California, this 9th day of December, 1930.

CLARENCE J. COBERLY.